(12) United States Patent
Henderson et al.

(10) Patent No.: US 9,919,807 B2
(45) Date of Patent: Mar. 20, 2018

(54) EXTERNAL-BLADDER FUEL SYSTEM FLUIDLY CONNECTABLE TO A FUEL TANK TO RECEIVE EXCESS

(71) Applicant: Raytheon Company, Waltham, MA (US)

(72) Inventors: Trent N. Henderson, Tucson, AZ (US); Christopher E. Toal, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 595 days.

(21) Appl. No.: 14/488,047

(22) Filed: Sep. 16, 2014

(65) Prior Publication Data

US 2016/0075440 A1    Mar. 17, 2016

(51) Int. Cl.
*B64D 37/12* (2006.01)
*B64D 37/06* (2006.01)
*B64D 37/00* (2006.01)

(52) U.S. Cl.
CPC ............ *B64D 37/06* (2013.01); *B64D 37/00* (2013.01); *B64D 37/12* (2013.01); *Y02T 50/44* (2013.01)

(58) Field of Classification Search
CPC ........ B64D 37/00; B64D 37/02; B64D 37/04; B64D 37/06; B64D 37/10; B64D 37/12
See application file for complete search history.

(56) References Cited

U.S. PATENT DOCUMENTS

| 1,976,456 | A | * | 10/1934 | Noonan | B64D 37/12 244/135 R |
|---|---|---|---|---|---|
| 2,124,867 | A | * | 7/1938 | Akerman | B64D 37/12 244/135 A |
| 2,355,084 | A | * | 8/1944 | Kurrle | B64D 37/06 220/4.15 |
| 2,362,297 | A | * | 11/1944 | Newell | B64D 37/12 137/512.1 |
| 2,365,080 | A | * | 12/1944 | Humphreys | B64D 37/12 220/4.15 |
| 2,381,400 | A | * | 8/1945 | Stavely | B64D 37/12 220/560.02 |
| 2,381,402 | A | * | 8/1945 | Weber | B64D 37/12 244/135 R |
| 2,552,119 | A | * | 5/1951 | Scharenberg | B64D 37/06 220/4.15 |
| 2,623,721 | A | * | 12/1952 | Harrington | B64D 37/06 244/135 R |
| 2,699,908 | A | * | 1/1955 | Fletcher | B64D 37/12 123/24 A |

(Continued)

*Primary Examiner* — Tien Q. Dinh
*Assistant Examiner* — Michael A. Fabula
(74) *Attorney, Agent, or Firm* — Renner, Otto, Boisselle & Sklar, LLP

(57) ABSTRACT

A bladder external to a fuel tank of a vehicle that allows an operational range of the vehicle to be increased. Preferably the bladder is external to the rest of the vehicle and the vehicle is an aircraft. The external bladder allows fuel in the fuel tank to expand and contract without requiring additional space within the vehicle, thus allowing more fuel mass to be held by the vehicle and a smaller vehicle profile that is more aerodynamically efficient. More preferably, the bladder is disconnectable from the rest of the vehicle to allow increasing of aerodynamic efficiency and weight reduction during use.

20 Claims, 4 Drawing Sheets

(56) References Cited

U.S. PATENT DOCUMENTS

| | | | | |
|---|---|---|---|---|
| 2,777,656 A * | 1/1957 | Clifton | B64D 37/04 | 220/905 |
| 2,838,261 A * | 6/1958 | Amos | B64D 37/12 | 220/4.15 |
| 2,844,178 A * | 7/1958 | Coleman | B64D 37/12 | 206/819 |
| 2,884,978 A * | 5/1959 | Grimm | B64D 37/06 | 220/560.03 |
| 2,924,359 A * | 2/1960 | Beremand | B64D 37/06 | 138/30 |
| 2,941,762 A * | 6/1960 | Thomas | B64D 37/06 | 244/117 R |
| 2,951,664 A * | 9/1960 | Smith | B64D 37/12 | 244/135 R |
| 2,952,427 A * | 9/1960 | Armstrong | B64D 37/12 | 220/654 |
| 3,043,542 A * | 7/1962 | Neuschotz | B64D 37/04 | 137/68.14 |
| 3,057,588 A * | 10/1962 | Kolbe | B64D 37/12 | 137/209 |
| 3,101,921 A * | 8/1963 | Price | B64D 37/12 | 244/135 B |
| 3,161,384 A * | 12/1964 | Czerwenka | B64D 37/12 | 220/4.15 |
| 3,409,253 A * | 11/1968 | Berg | B64D 37/04 | 220/6 |
| 3,416,762 A * | 12/1968 | Headrick | B64D 9/00 | 220/1.5 |
| 3,447,768 A * | 6/1969 | McQueen | B64D 37/04 | 244/135 R |
| 3,782,400 A * | 1/1974 | Hardison | B64D 37/16 | 137/209 |
| 3,843,078 A * | 10/1974 | Schon | B64D 37/04 | 244/135 B |
| 3,966,147 A * | 6/1976 | Wittko | B64D 37/04 | 220/905 |
| 3,978,901 A * | 9/1976 | Jones | B65D 88/1656 | 206/524.5 |
| 4,026,503 A * | 5/1977 | Rhodes | B64D 37/04 | 220/562 |
| 4,214,721 A * | 7/1980 | Burhans, Jr. | B64D 37/04 | 220/6 |
| 4,306,693 A * | 12/1981 | Cooper | B64D 37/12 | 137/572 |
| 4,426,050 A * | 1/1984 | Long | B64D 37/12 | 244/135 R |
| 4,640,328 A * | 2/1987 | Arney | B65D 88/1656 | 220/565 |
| 4,664,134 A * | 5/1987 | Pera | B64D 37/24 | 137/14 |
| 4,715,417 A * | 12/1987 | Coloney | B64D 37/04 | 220/562 |
| 4,723,577 A * | 2/1988 | Wusterbarth | F16L 55/053 | 138/30 |
| 4,776,537 A * | 10/1988 | Garside | B64D 37/04 | 244/130 |
| 4,784,354 A * | 11/1988 | Tavano | B64D 37/06 | 244/135 B |
| 4,790,350 A * | 12/1988 | Arnold | B64D 37/12 | 137/588 |
| 4,854,481 A * | 8/1989 | Bohl | B64D 37/00 | 141/114 |
| 4,860,972 A * | 8/1989 | Lannerd | B64D 37/04 | 244/135 R |
| 4,932,609 A * | 6/1990 | Secchiaroli | B64C 17/10 | 137/256 |
| 4,948,070 A * | 8/1990 | Lyman | B64D 37/06 | 220/720 |
| 5,042,751 A * | 8/1991 | Kolom | B64D 37/06 | 220/581 |
| 5,054,635 A * | 10/1991 | Kolom | H01L 31/073 | 220/4.15 |
| 5,242,743 A * | 9/1993 | Nakanishi | B29C 70/16 | 156/138 |
| 5,402,968 A * | 4/1995 | Baldwin | B64D 37/02 | 220/4.15 |
| 5,467,889 A * | 11/1995 | Ashton | B29C 53/824 | 220/562 |
| 5,845,879 A * | 12/1998 | Jensen | B64D 37/04 | 220/720 |
| 5,927,651 A * | 7/1999 | Geders | B64D 37/04 | 244/135 B |
| 5,975,466 A * | 11/1999 | Kahara | B64D 37/02 | 244/130 |
| 6,101,964 A * | 8/2000 | Lesesne | B63B 25/12 | 114/256 |
| 6,125,882 A * | 10/2000 | Kong | B64C 17/10 | 137/213 |
| 6,491,255 B1 * | 12/2002 | Bracken | B64D 37/04 | 220/4.15 |
| 7,255,190 B1 * | 8/2007 | Floro | B62J 9/008 | 180/219 |
| 8,016,238 B2 * | 9/2011 | Padan | B64D 37/12 | 244/135 C |
| 8,500,170 B2 * | 8/2013 | Pfaff | B62D 35/001 | 220/4.14 |
| 8,920,998 B2 * | 12/2014 | McLean | H01M 8/04089 | 429/443 |
| 9,352,845 B1 * | 5/2016 | Albert | B64D 37/06 | |
| 2006/0076460 A1 * | 4/2006 | Snow, Jr. | B64C 23/065 | 244/199.2 |
| 2006/0108476 A1 * | 5/2006 | Padan | B64D 37/12 | 244/135 R |
| 2006/0192047 A1 * | 8/2006 | Goossen | B64C 27/20 | 244/17.23 |
| 2009/0314783 A1 * | 12/2009 | Losinski | B64D 37/08 | 220/530 |
| 2016/0009406 A1 * | 1/2016 | Burnell | B64D 37/32 | 244/135 R |

* cited by examiner

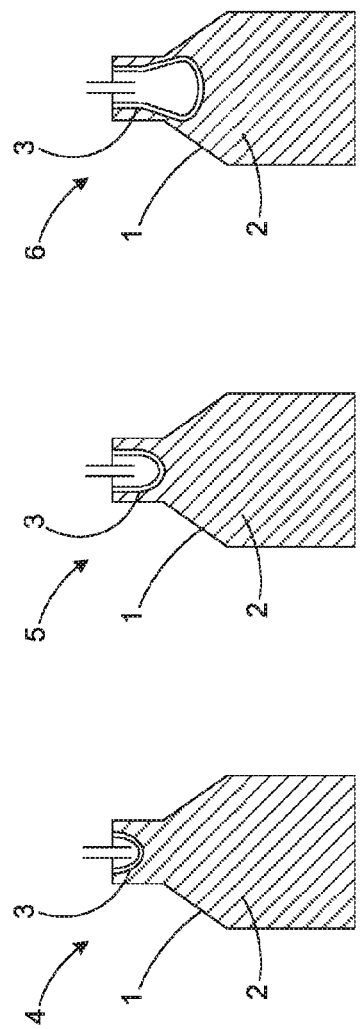
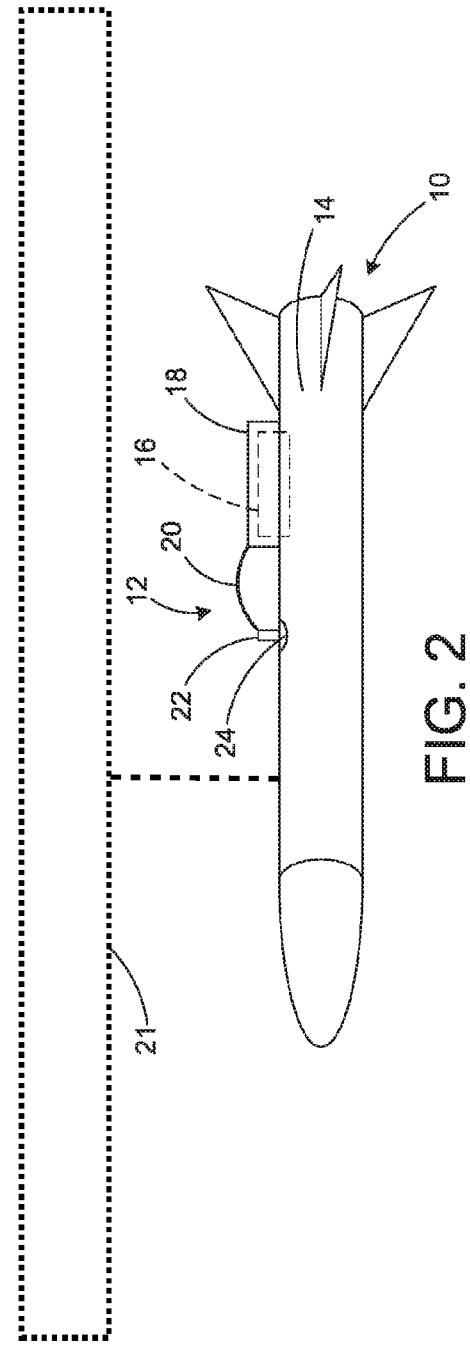

EXTERNAL-BLADDER FUEL SYSTEM FLUIDLY CONNECTABLE TO A FUEL TANK TO RECEIVE EXCESS

FIELD OF INVENTION

The present invention relates generally to fuel systems, and more particularly to aircraft fuel systems.

BACKGROUND

Aircraft use a variety of materials to provide energy to mobilize the aircraft. Often, aircraft use fuel tanks to supply a liquid fuel to an engine that allows mobilization of the aircraft. The fuel tanks typically have a maximum capacity that is fixed while a fuel held in the fuel tank may have a variable volume that changes during transportation and use of the aircraft.

Air-breathing-engine fuels (e.g., JP-10, JP-8, JP-7, and JP-5) used in various vehicles, such as aircraft (e.g., cruise missiles, UAVs, Drones, Decoys, and Aerial Target vehicles), have densities that vary as a function of temperature. This causes the fuel volume to expand as the system is exposed to heat or contract when exposed to cold temperature extremes. For example, over a change in temperature of 111.1° C. (200° F.) (e.g., −51° C. (−60° F.) to 60° C. (140° F.)) JP-10 fuel will change in volume approximately 8%. The volumes of JP-8, JP-7 and JP-5 vary by 10% or more over the same temperature range.

In the past fuel tanks have included ullage space within a fuel tank to allow for expansion and contraction of the fuel. This generally results in fuel volume constraints on the system due to tank sizing limits. In vehicle design a goal is to maximize fuel within the available volume. At a maximum temperature the fuel may expand to the maximum capacity of the fuel tank and the ullage would be at zero. As the fuel cools the volume of the fuel reduces and the volume of the ullage space increases.

Referring to FIG. 1, in the past a fuel tank 1 included fuel 2 and a rubber inner bladder 3 to interface between the fuel tank 1 and the exterior environment. The rubber inner bladder 3 prevents leakage of fuel from the fuel tank 1 and provides for ullage volume increase and decrease resulting from temperature variation. The rubber inner bladder 3 separates atmospheric air from the fuel 2 and acts as an expanding and contracting balloon that remains within the fuel tank 1 to provide for the ullage volume changes. The rubber inner bladder 3 cannot significantly protrude outside of the fuel tank 1 past a position shown under a high temperature condition 4. Rigid walls of the fuel tank 1 and a small opening to atmospheric air prevent the rubber inner bladder 3 from significantly protruding outside, which limits the total mass of the fuel 2 the aircraft can hold when subjected to the high temperature condition 4.

Under the high temperature condition 4 the fuel 2 is at a maximum volume and the rubber inner bladder 3 is at its smallest ullage volume. Under a medium temperature condition 5 the fuel 2 is slightly contracted and the rubber inner bladder 3 expands with air to fill the volume within the fuel tank 1 that was created by the contraction of the fuel 2 due to the reduction in temperature. Under a low temperature condition 6 the fuel 2 contracts more than the medium temperature condition 5 and the rubber inner bladder 3 expands with air further filling the available volume in the fuel tank 1. In all three temperature conditions 4, 5, and 6 the mass of the fuel is the same, but the volume the fuel occupies changes and the mass of air inside the fuel tank changes due to changes in the fuel's density. The fuel tank 1 with the rubber inner bladder 3 design must be under-filled at ambient temperatures to account for fuel expansion at higher temperature conditions, such as the high temperature condition 4, because the rubber inner bladder 3 cannot expand outward of the fuel tank 2. These higher temperature conditions generally occur during transport or storage, thus resulting in wasted ullage space within the fuel tank during operation in typical environments.

Normally refuelable fuel system include venting and refuel ports and are open to the environment. In some aircraft the fuel is isolated from the surrounding environment to isolate the fuel from water and air intrusion, which can cause the fuel to develop mold or allow fuel vapor to evaporate over time.

SUMMARY OF INVENTION

The present invention provides a bladder external to a fuel tank of a vehicle and allows an operational range of the vehicle to be increased. Preferably the bladder is external to rest of the vehicle and the vehicle is an aircraft. The external bladder allows fuel in the fuel tank to expand and contract without requiring additional space within the vehicle, thus allowing more fuel mass to be held by the vehicle and a smaller vehicle profile that is more aerodynamically efficient. More preferably, the bladder is disconnectable from the rest of the vehicle to allow increasing of aerodynamic efficiency and weight reduction during use.

With an external bladder the minimum fuel (by weight) onboard the vehicle occurs at the hot temperature extreme. As the vehicle cools from its hottest point, the fuel contracts and additional fuel transfers from the external bladder to the fuel tank. This creates some flexibility in the vehicle planning parameters and mission planning. An aspect of the invention includes a flexible bladder external to a fuel tank.

Another aspect of the invention includes a flexible bladder detachable from a fuel tank.

Yet another aspect of the invention includes transferring fluid from a tank to an external bladder. After transferring fluid to the external bladder the fluid may be transferred back into the tank.

According to one aspect of the invention, an aircraft includes a fuel tank, and a flexible bladder external to the fuel tank and fluidly connected to the fuel tank, wherein the flexible bladder is capable of expanding to at least 5% of the capacity of the fuel tank. Any of the above aspects may include any of the below features individually or in combination.

The flexible bladder may be capable of expanding to at least 7% of the capacity of the fuel tank.

The flexible bladder may be attached to a housing of the aircraft.

The flexible bladder may be attached to an outer skin of the aircraft.

The aircraft may include a fluid passage fluidly connected to the fuel tank and the flexible bladder.

The fluid passage may include a sealing disconnection, whereby the flexible bladder is fluidly disconnectable from the fuel tank with no external leakage.

The fluid passage may include a quick disconnect.

The fluid passage may be fluidly connected to a stop valve.

The fluid passage may be fluidly connected to a bi-directional valve configured to prevent fluid flow from the fuel tank and out of the fluid passage when the fluid passage is disconnected from the flexible bladder.

The fluid passage may be connected to an outer skin of the aircraft.

The fuel tank and the flexible bladder may be connected by a fluid passage having a cross-section at a connection with the fuel tank that is narrower than a corresponding portion of the fuel tank.

The fuel tank may be a sealed fuel tank.

The aircraft may be removably connected to an airplane.

According to another aspect of the invention, an aircraft fuel system includes a fuel tank, a valve fluidly connected to the fuel tank and having an aircraft connector, and a compressible bladder outside of the fuel tank and fluidly connected to an external connector connectable with the aircraft connector, wherein the external connector is coupled to the aircraft connector to allow fluid flow therethrough. The above aspect may include any of the above or below features individually or in combination.

The fuel tank may be fluidly connected to the compressible bladder while the external connector is coupled to the aircraft connector.

The compressible bladder may be capable of expanding to at least 7% of the capacity of the fuel tank.

The compressible bladder may be attached to a housing of an aircraft including the aircraft fuel system.

The compressible bladder may be attached to an outer skin of an aircraft including the aircraft fuel system.

The aircraft may include a fluid passage fluidly connected to the fuel tank and the compressible bladder.

The fluid passage may include a sealing disconnection, whereby the compressible bladder is fluidly disconnectable from the fuel tank.

The fluid passage may be fluidly connected to a bi-directional valve configured to prevent fluid flow from the fuel tank and out of the fluid passage when the fluid passage is disconnected from the compressible bladder.

The fuel tank and the compressible bladder may be connected by a fluid passage having a cross-section at a connection with the fuel tank that is narrower than a corresponding portion of the fuel tank.

The aircraft fuel system may be part of an aircraft removably connected to an airplane.

According to yet another aspect of the invention, a method of maximizing fuel in a fuel tank of an vehicle includes transferring into a bladder an extra volume of fuel, where the extra volume is the portion of an entire volume of fuel that exceeds a maximum capacity of the fuel tank, and transferring at least some of the extra volume of the fuel from the bladder into the fuel tank, in response to the entire volume of the fuel decreasing. The above aspect may include any of the above or below features individually or in combination.

The extra volume may be at least 5% of the maximum capacity.

The extra volume may be at least 7% of the maximum capacity.

The extra volume may be transferred in response to the entire volume of the fuel increasing.

The extra volume may be transferred in response to an average density of the fuel decreasing.

The extra volume may be transferred in response to an average temperature of the fuel increasing.

The at least some of the extra volume may be transferred in response to an average density of the fuel increasing.

The at least some of the extra volume may be transferred in response to an average temperature of the fuel decreasing.

The method of maximizing fuel may further include disconnecting the bladder in response to transferring the at least some of the extra volume of the fuel from the bladder into the fuel tank.

The method of maximizing fuel may further include disconnecting the bladder in response to the vehicle taking off or being launched.

The at least some of the extra volume may be all of the extra volume.

The at least some of the extra volume may be at least 80% of the extra volume.

The method of maximizing fuel may further include disconnecting the bladder in response to transferring at least some of the extra volume of the fuel from the bladder into the fuel tank until the entire volume of the fuel is less than or equal to the maximum capacity.

The foregoing and other features of the invention are hereinafter described in greater detail with reference to the accompanying drawings.

BRIEF DESCRIPTION OF THE DRAWINGS

FIG. 1 is a schematic cross-section view of fuel in a prior art fuel tank at multiple temperatures.

FIG. 2 is a side view of an aircraft with an exemplary aircraft fuel system.

DETAILED DESCRIPTION

Figure 3:
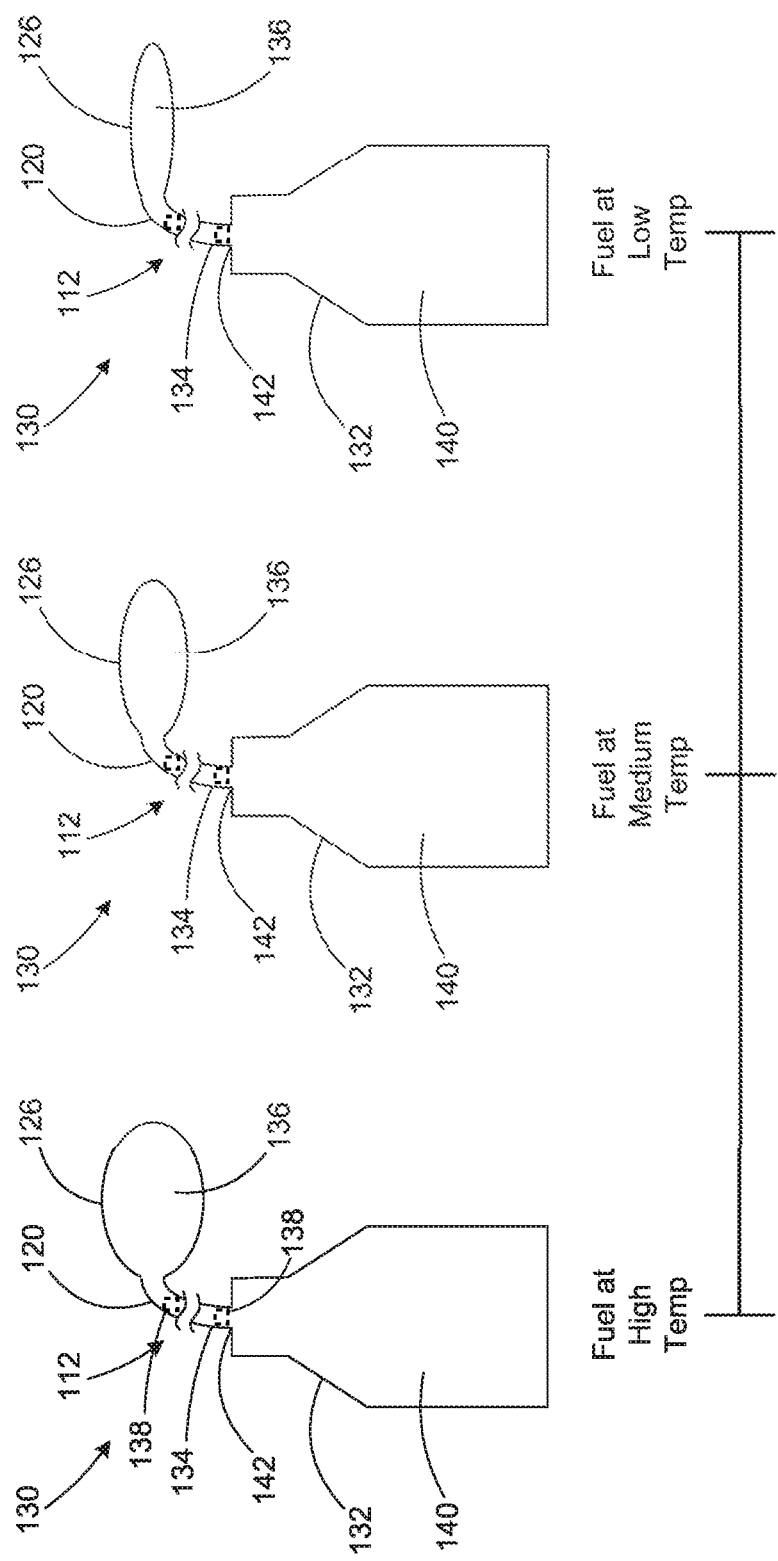
FIG. 3 is cross-section of another exemplary aircraft fuel system including an exemplary bladder at multiple temperatures.

The principles of this present application have particular application to fuel systems for maximizing fuel load and increasing operational range of an aircraft, such as a missile, and thus will be described below chiefly in this context. The principles of this invention may be applicable to other fluid systems where it is desirable to maximize a fluid capacity of the fluid system and/or to increase an operational range of a vehicle attached to the fluid system.

The classical fuel system design approach is to allocate a change in volume to an internal rubber inner bladder system of an aircraft thereby permitting a tank in the aircraft to breath as the system adjusts to an external temperature. The classical approach results in a constant fuel load in the tank. The fuel load is set by the fuel volume available at the maximum fuel temperature. At a maximum temperature the tank volume is full with fuel and the ullage is zero, exemplified by the high temperature condition 4 of FIG. 1. As the fuel cools, the volume of fuel reduces (e.g., contracts) and the volume of ullage increases (e.g., expands), exemplified by the medium temperature condition 5 and the low temperature condition 6 of FIG. 1. But in this classical ullage approach, the mass of fuel in the tank is a constant. The mass 2 of state 4, 5, and 6 is the same, but with different densities.

In most aircraft life profiles, the high fuel temperature extremes are most likely to occur during transportation or storage of the aircraft and not during launch or deployment. In the classical approach, the load of fuel in the tank is thus defined by an environment not directly impacting the aircraft launch sequence.

Aviation fuels, such as JP-10 fuel, expand and contract linearly with temperature. The available fuel volume in terms of fuel mass of an aircraft changes based on temperatures that the aircraft will be exposed to as a result of the fuel in the aircraft expanding and contracting with temperature. For example, a standard internal ullage aircraft exposed to temperatures between −45.6° C. (−50° F.) and 65.5° C. (150° F.) may be filled to a maximum fuel load of 454 kg (1000 lb) without fuel expanding past the maximum volume of the internal ullage design. At 65.5° C. (150° F.) the mass of fuel on board is 454 kg (1000 lb). At −45.6° C. (−50° F.) the mass of fuel is still 454 kg (1000 lb), but the fuel occupies 8.5% less volume, that is now wasted ullage space. An aircraft utilizing an external bladder of the present application may be filled to a maximum fuel load of 492.1 kg (1085 lb) allowing fuel expanding past a maximum volume of the fuel tank filled with 454 kg (1000 lb) of fuel into the external bladder. The external bladder allows fuel mass within the fuel tank to increase as fuel temperature reduces, for example reducing from the maximum temperature.

The use of external ullage allows an engineering team to select a more nominal or operationally representative temperature for the flight planned point to meet a required fuel volume. By using external ullage, the launch planned point can be achieved with less internal aircraft volume and still allow for the effective pressure relief within the aircraft when it is heated during transportation or storage. For example, JP-10 fuel expands about 4% when temperature is increased from −17.8° C. (0° F.) to 37.8° C. (100° F.). From a planning and sizing point of view, the minimum fuel load based on a desired operation range could be set at a standard day/altitude temperature of 21.1° C. (70° F.) or cold soaked to between −17.8° C. (0° F.) and −6.67° C. (20° F.), thereby allowing a smaller fuel tank to hold the minimum range fuel load. From a mission planning point of view, if the fuel temperature is known at launch, the range could be increased from the specification minimum, accounting for the additional fuel mass on board due to the fuel being denser. A vehicle that can carry a fuel load of 454 kg (1000 lb) of JP-10 at 65.5° C. (150° F.) is capable of carrying a fuel load of 479 kg (1055 lb) of JP-10 at −6.7° C. (20° F.).

Referring now in detail to the drawings and initially to FIG. 2, an aircraft is designated generally by reference numeral 10. For example, the aircraft 10 may be a missile (such as a Tomahawk Missile, a Harpoon Missile, a Joint Air-to-Surface Standoff Missile (JASSM), or an Cruise Missile, to give a few examples), or an aerial vehicle (such as a MINIATURE AIR LAUNCH DECOY (MALD®), an unmanned aerial vehicle (UAV), a micro UAV, a drone, a decoy, or an aerial target, to give a few examples). The aircraft 10 includes an external bladder assembly 12 (comprised of 24, 22, 20, 16 and 18) that is attached to an outer portion of the aircraft 10. The external bladder assembly 12 can be provided, for example, in a fuel system of the aircraft 10. The bladder assembly 12 is preferably removably attached to a fuel tank (shown in FIG. 3) and the outer portion of the aircraft 10. Other locations and applications of the external bladder assembly 12 are possible.

The external bladder assembly 12 includes a bladder housing 18 connected to an outer portion of the aircraft 10, a bladder 16 (arrow pointing with the rectangle represented by 18) and a fluid passage 20 connected to the bladder 16 through the bladder housing 18 and to the outer portion of the aircraft 10.

The bladder housing 18 may be a rigid structure for fixedly connecting to the outer portion of the aircraft 10 and for securing a bladder 16 (discussed further below) to the aircraft 10 to fluidly connect the bladder to the aircraft 10 through the fluid passage 20. The bladder housing 18 is not necessarily rigid. In an embodiment, at least a portion of the bladder housing 18 is flexible. In another embodiment, at least a portion of the bladder housing is compressible. For example, the bladder housing may fold or bend similar to an accordion. In yet another embodiment, the bladder forms at least a portion of the bladder housing 18 such that the profile of the bladder housing 18 reduces when as the bladder contracts. In another embodiment, the bladder housing 18 is not provided and only a bladder is used.

The outer portion of the aircraft 10 includes the outer aircraft skin 14. The aircraft skin 14 forms the shape and general structure of the aircraft 10. Removably connecting the bladder housing 18 allows removal of the bladder housing 18 prior to or during operation. Alternatively, the aircraft skin 14 may be fixedly attached to the bladder housing 18 to prevent removal of the bladder housing 18 during operation. In another embodiment, an airplane 21 (schematically shown) is removably connected to the aircraft 10. For example, the aircraft 10 may be a missile that is carried by a wing of the airplane 21 prior to launch from the airplane 21. Alternatively, the aircraft may be removably connected to a land vehicle or another aircraft launching device.

The outer aircraft skin 14 forms an outermost portion of the aircraft 10. The outer aircraft skin 14 may be removably connected to the bladder housing 18 to allow removal of the bladder housing 18 and the bladder 16 prior to or during operation. In an embodiment, the outer aircraft skin 14 is connected to the fluid passage 20.

The fluid passage 20 may be constructed of any suitable material that is fuel resistant and out-gas resistant for allowing fuel flow without degrading the fluid passage 20. For example, the fluid passage 20 may be made of polyurethane or nitrile rubber.

The fluid passage 20 includes an external connector 22 for removably connecting the fluid passage 20 to the outer portion of the aircraft 10. The external connector 22 may be any suitable type for removably attaching to an aircraft connector 24 (not shown) on the aircraft 10 that allows fluid flow between the fluid passage 20 and the aircraft 10. For example, the external connector 22 may be a quick-disconnect connector 212 or 214, as shown in FIG. 4.

Figure 4:
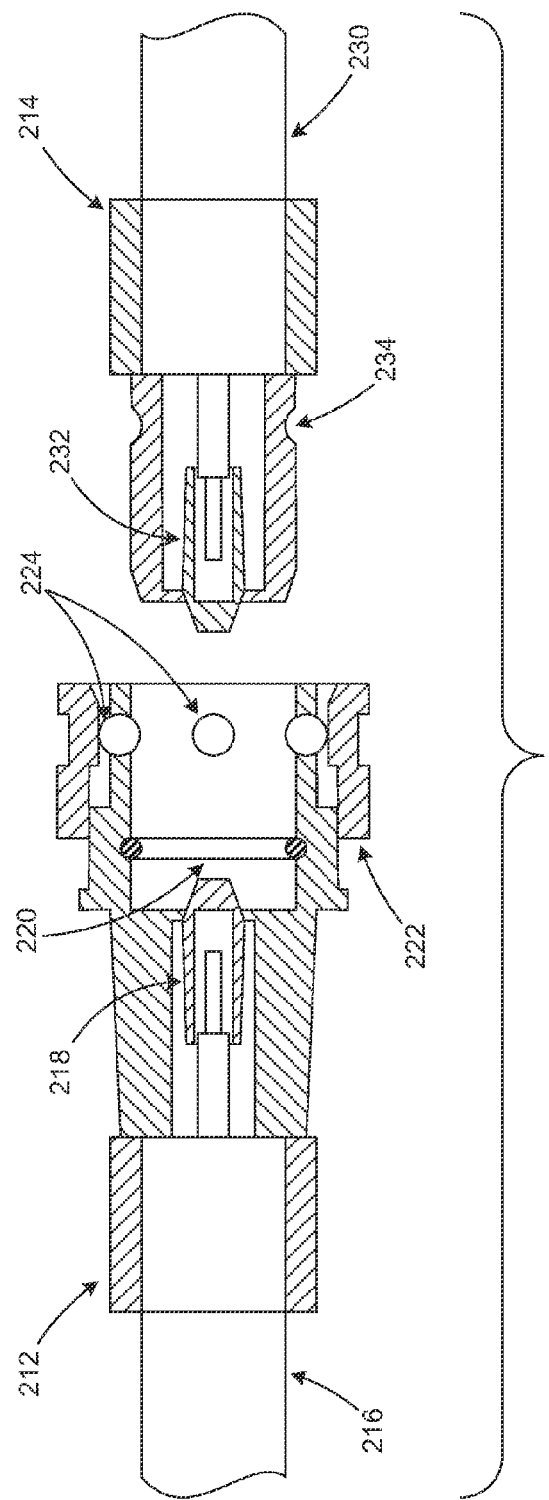
FIG. 4 is an exemplary fluid connection utilizing a pair of quick-disconnect connectors.

Referring briefly to FIG. 4, the quick-disconnect connector 212 is a female connector that receives the quick-disconnect connector 214. The quick-disconnect connector 212 includes a channel 216 fluidly connected to a valve 218, an o-ring seal 220 for sealing against the quick-disconnect connector 214, a ring socket 222 for locking and unlocking detent balls 224 against the quick-disconnect connector 214.

The quick-disconnect connector 214 is a male connector that is insertable into the quick-disconnect connector 212 and includes a channel 230 fluidly connected to a valve 232, and a detent notch 234 for receiving the detent balls 224. When inserted, the o-ring seal 220 seals against the quick-disconnect connector 214, the ring socket 222 locks the detent balls into the detent notch 234, and the valves 218 and 232 engage one another to fluidly connect the channels 216 and 230, thereby allowing fluid to flow from one to the other. In an embodiment, quick-disconnect connector 212 is connected to a bladder and quick-disconnect connector 214 is connected to a liquid fuel tank, thereby allowing liquid fuel to flow between the fuel tank and the bladder when the quick-disconnect connectors 212 and 214 are connected. The quick-disconnect connectors 212 and 214 (exemplary sealing disconnections)also may prevent liquid fuel from flowing out of either the fuel tank or bladder when the quick-disconnect connectors 212 and 214 are disconnected.

Referring again to FIG. 2, removably connecting the external connector 22 to the aircraft connector 24 allows the external bladder assembly 12 to be easily fluidly disconnected from the aircraft 10. When the external connector 22 is coupled to the aircraft connector 24 fluid is able to flow therethrough. In an embodiment, at least one of the external connector 22 and/or the aircraft connector 24 include a sealing disconnection that allows fluid to transfer between the bladder 126 (FIG. 3) and a fuel tank 132 (FIG. 3) of the aircraft 10 when connected. The sealing disconnection also allows sealing both bladder 126 and fuel tank 132 when disconnected. The sealing disconnection allows the external bladder assembly 12 to be detached from the rest of the aircraft 10 without fuel escaping through the aircraft connector 24 or the external connector 22.

In another embodiment, the external bladder assembly 12 is disconnected after take-off or launch of the aircraft 10, which reduces the carrying load of the aircraft 10 and reduces drag to increase fuel efficiency of the aircraft 10. Increasing fuel efficiency of the aircraft 10 increases a range the aircraft is capable of flying on a given amount of fuel. Alternatively, the external connector 22 may be permanently attached to the aircraft connector 24.

Turning now to FIG. 3, an exemplary embodiment of the external bladder assembly is shown at 112. The external bladder assembly 112 is substantially the same as the above-referenced external bladder assembly 12, and consequently the same reference numerals but indexed by 100 are used to denote structures corresponding to similar structures in the external bladder assembly 112. In addition, the foregoing description of the external bladder assembly 12 is equally applicable to the external bladder assembly 112 except as noted below. Moreover, it will be appreciated upon reading and understanding the specification that aspects of the external bladder assemblies may be substituted for one another or used in conjunction with one another where applicable.

A fuel system 130 includes the external bladder assembly 112 fluidly connected to a fuel tank 132 through a fluid passage 134. The external bladder assembly 112 includes a bladder 126 and a fluid passage 120 fluidly connected to the fluid passage 134.

The bladder 126 includes a bladder interior volume 136 that changes size based on the temperature of fuel within the bladder and the fuel tank 132. The bladder is flexible and may be made of any suitable material for holding fuel. For example, the bladder 126 may be made of polyurethane or nitrile rubber. In an embodiment the bladder is compressible. For example, the bladder may fold or bend similar to an accordion. Compressing the bladder similar to an accordion allows reduction of the interior volume of the bladder while the bladder is constructed of primarily rigid components. The bladder 126 is shown with fuel under three different temperature conditions: high, medium, and low (for example 48.9° C. (120° F.), 15.6° C. (60° F.), and −34.4° C. (−30° F.)). The size of the bladder interior volume 136 corresponds to the temperature condition due to the effect of temperature on the density of the fuel.

For example, the average density of a liquid increases as temperature increases. Density of the fuel is described herein using relative terms that describe the density of a fuel at one temperature relative to the density of the fuel at a different temperature. The total mass of fuel in the system 130 is constant throughout the examples. However, the mass of the fuel within the fuel tank 132 is at its lowest point at the high temperature but increases as the temperature reduces. Conversely, the bladder 126 has the largest mass of fuel at the high temperature, but progressively loses that mass to maintain a full fuel tank 132 at all lower temperature conditions.

The bladder interior volume 136 may be full at the high temperature condition when the fuel has a low density due to the high temperature. At full capacity the bladder interior volume 136 may contain at least 5% of the capacity of the fuel tank 132. In an embodiment, the bladder interior volume 136 contains at least 7% of the capacity of the fuel tank 132. The high temperature condition may occur at various stages of the lifespan of the fuel system 130. For example, the high temperature condition may occur during storage or transportation of the fuel system 130, which may be fully assembled as part of the aircraft 10 (FIG. 2). In an embodiment, the bladder interior volume 136 is full at a temperature condition greater than the high temperature. In another embodiment, the bladder interior volume 136 is full at a temperature condition equal to the high temperature. The bladder interior volume 136 may be partially full at the medium temperature condition when the fuel has an intermediate density due to the intermediate temperature. The fuel tank 132 will be completely full. The medium temperature condition may occur at various stages of the lifespan of the fuel system 130. For example, the medium temperature condition may occur during transportation or field use of the fuel system 130.

The bladder interior volume 136 may be empty or nearly empty at the low temperature condition when the fuel has a high density due to the low temperature. The fuel tank 132 will be completely full. The low temperature condition may occur at various stages of the lifespan of the fuel system 130. For example, the low temperature condition may occur during field-use of the fuel system 130, such as at high altitudes. For example, a high altitude may be over 3048 m (10,000 ft). In an embodiment, the bladder interior volume 136 is empty at a temperature condition less than the low temperature. In another embodiment, the bladder interior volume 136 is empty at a temperature condition colder than the low temperature.

During use temperature may rise or lower depending on the temperature conditions. As the temperature lowers fuel flows from the bladder interior volume 136 to the fuel tank 132 via the fluid passage 120 and the fluid passage 134. As the temperature raised fuel flows from the fuel tank 132 to the bladder interior volume 136 via the fluid passage 134 and the fluid passage 120. The fuel tank volume 132 is always full.

The fluid passage 120 and the fluid passage 134 include a respective tubular portion that allows fuel to flow to and between the fuel tank 132 and the bladder interior volume 136 via the fluid passage 120 and the fluid passage 134. The fluid passage 120 is fixedly attached to the fluid passage 134 and may be one piece with the fluid passage 134. In an embodiment, the fluid passage 120 includes an external connector 22 (FIG. 2) to removably connect the fluid passage 120 to the fluid passage 134.

In another embodiment, at least one of the fluid passages 120 and 134 includes a valve. For example, each fluid passage 120 and 134 may include a valve 138 (schematically shown)that may be a stop valve or a bi-directional valve (exemplary sealing disconnections). The valve 138 included in the fluid passage 120 may allow fluid flow to and from the bladder interior volume 136 while the fluid passage 120 is connected to the fluid passage 134, but to prevent fluid flow while the fluid passage 120 is disconnected from the fluid passage 134. The valve 138 included in the fluid passage 134 may allow fluid flow to and from the fuel tank 132 while the fluid passage 134 is connected to the fluid passage 120, but to prevent fluid flow while the fluid passage 134 is disconnected from the fluid passage 120. In yet another embodiment, the fluid passage 134 includes an aircraft connector 24 (FIG. 2) to removably connect the fluid passage 134 to the fluid passage 120.

The fuel tank 132 includes an interior tank volume 140 and a fuel port 142 fluidly connecting the fluid passage 134 and the interior tank volume 140. The fuel tank 132 may be made of any suitable material or in any suitable shape for carrying fuel, such as JP-10 fuel. Similarly, the interior tank volume 140 may be constructed of any suitable material that is fuel resistant and out-gas resistant for allowing fuel flow without degrading the interior tank volume 140. For example, the interior tank volume 140 may be made of polyurethane, nitrile rubber, aluminum, steel or composite material. The fuel tank 132 may be sealed (e.g., by the valve 138 included in the fluid passage 134). Sealing the fuel tank 132 prevents fuel from leaking to atmosphere through the fuel port 142 or elsewhere.

The fuel port 142 is located at an outer portion of the fuel tank 132 to allow fuel to flow between the interior tank volume 140 and the fluid passage 134. The fuel port 142 has a cross-section that is smaller than the average cross-section of the fuel tank 132 to connect to the fuel passage 134. In an embodiment, the fuel port 142 has a cross-section that is narrower than a corresponding portion of the fuel tank 132. In another embodiment the fuel passage 134 is formed in one-piece with the fuel tank 132. Alternatively, the fuel port 142 may connect directly to the fluid passage 120. In another embodiment, the fuel tank 132 is made of a rigid material and the fuel port 142 is formed a rigid portion of the fuel tank 132.

During use fuel flows freely between the bladder interior volume 136 and the fuel tank 132 based on the temperature and density change of the fuel. The bladder 126 may remain external to the interior tank volume 140 when the volume of the fuel is below a maximum capacity of the interior tank volume 140. For example, the interior tank volume 140 may be filled to or beyond its maximum capacity while the fuel is at medium temperature. Filling the interior tank volume 140 to or beyond its maximum capacity allows the aircraft (FIG. 2) to carry more fuel and in turn fly greater distances. After filling the interior tank volume 140, the fuel may expand further beyond the maximum capacity of the interior tank volume 140 and flow into the bladder interior volume 136. An extra volume of fuel is the portion of fuel that exceeds a maximum capacity of the fuel tank 132 and is transferred into the bladder 126 (as exemplified by step 300 of the flowchart in FIG. 5).

The fuel system 130 may be a closed system to prevent fuel vapor from escaping. As a result the bladder 126 becomes a pressure equalization device. When the fuel is heated it expands and instead of pressurizing walls of the fuel tank 132, fuel is forced overboard into the bladder 126 to maintain pressure equivalent to the surrounding environment. Conversely, the fuel may transfer out of the bladder 126 back into the fuel tank 132 due to a vacuum created when the fuel cools and the density decreases. For example, the fuel tank 132 may experience negative pressure relative to the bladder 126 to allow transfer of fuel from the bladder 126 to the fuel tank 132. The pressure differential between the bladder 126 and the fuel tank 132 allows fuel transfer based on the temperature of the fuel without another device to pump or otherwise force fuel between the bladder 126 and the fuel tank 132.

Allowing the fuel to expand and flow into the bladder interior volume 136 allows the fuel system 130 to hold more fuel. The fuel system 130 is able to hold more fuel without necessarily increasing a size of the fuel tank 132 or the aircraft 10. Holding more fuel in the bladder 126 increases fuel capacity because fuel would be retained that could otherwise be lost due to overflow or damage the fuel system 130. In response to the entire volume of the fuel decreasing, equivalent volume of the extra volume of the fuel is transferred from the bladder 126 into the fuel tank 132 (as exemplified by step 302 of the flowchart in FIG. 5). For example, the temperature of the fuel may decrease. Alternatively, some of the fuel may be used during operation of the aircraft 10 causing the entire volume of the fuel to decrease because the fuel load decreased, thereby transferring at least some of the fuel from the bladder 126 into the fuel tank 132.

Figure 5:
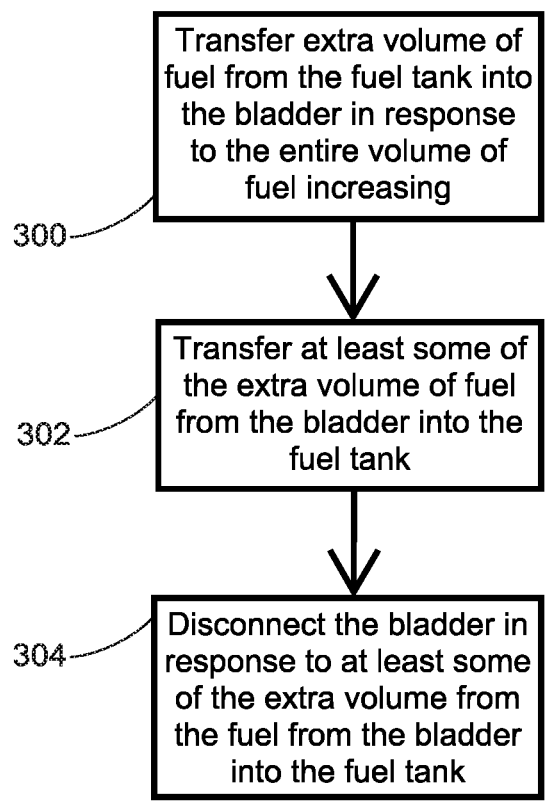
FIG. 5 is an exemplary flowchart exemplifying operation of the fuel tank and the bladder.

The bladder 126 may be disconnected from the aircraft 10 (FIG. 2) in response to transferring at least some of the fuel from the bladder 126 into them fuel tank 132 (as exemplified by step 304 of the flowchart in FIG. 5). In an embodiment, the bladder 126 is disconnected from the rest of the aircraft 10 in response to the aircraft 10 taking off or being launched. For example, the aircraft 10 may be starting a launch sequence and at an operating temperature that allows the fuel to decrease in volume. Alternatively, the aircraft 10 may be removed from storage and attached to an airplane on the ground (not shown) for a military operation and the bladder 126 may be disconnected from the aircraft 10 in response to the fuel temperature lowering after removal from storage. For example, at least 80% of the fuel in the bladder interior volume 136 may transfer into the fuel tank 132 prior to disconnection of the bladder 126. Alternatively, all of the fuel in the bladder interior volume 136 may transfer into the fuel tank 132 prior to disconnection of the bladder 126.

Also, holding more fuel in the bladder interior volume 136 allows the interior tank volume 140 to be smaller while still carrying the same fuel load during field-use and hence having the same operational range. Using a smaller interior tank volume 140 allows use of a smaller fuel tank 132. The smaller fuel tank 132 allows decreasing the profile of the aircraft 10 (FIG. 2). Decreasing the profile of the aircraft 10 (FIG. 2) allows drag reduction, which increases the fuel efficiency and the operational range with a given fuel load in the smaller fuel tank 132. Thus, the fuel tank 132 and the profile of the aircraft 10 (FIG. 2) can be iteratively reduced in size, while retaining the same operational range.

For example, a Sears-Hack curve for a 454 kg (1000 lb) fuel load vehicle illustrates how much the cross-sectional area of an aircraft 10 (FIG. 2) may be reduced based on a missile station of the aircraft 10. The missile station indicates the forward to aft location on the aircraft 10 and the cross sectional area represents the cross sectional area of the aircraft 10 perpendicular to a center line of the aircraft 10 at the particular missile station. Cross sectional area is a primary contributor to drag, so reduced cross section means less drag and with everything else equal longer range. For example, at a missile station of about 254 cm (100 in) the cross-sectional area of the aircraft 10 can be reduced by 98 cm$^2$ (15.13 in$^2$) while retaining a 454 kg (1000 lb) fuel load. As mentioned above, reducing the cross-section reduces drag and allows an increase of the operational range of the aircraft 10. Thus a smaller profile aircraft may have a longer operational range with the same 454 kg (1000 lb) fuel load.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An aircraft including:
   a fuel tank; and
   a flexible bladder for receiving fuel expansion from the fuel tank, wherein the flexible bladder is external to the fuel tank and fluidly connected to the fuel tank such that a fuel within the fuel tank is able to flow from the fuel tank to the flexible bladder
   wherein the flexible bladder is capable of expanding to at least 5% of the capacity of the fuel tank;
   wherein when the aircraft is in a first state, the flexible bladder is fluidly connected to the fuel tank, the fuel is at a low temperature and fills the fuel tank, and the fuel has a predetermined mass;
   wherein when the aircraft is in a second state, the flexible bladder is fluidly connected to the fuel tank, the fuel is at a high temperature and excess fuel is within the flexible bladder, and the fuel has the predetermined mass; and
   wherein the flexible bladder is removably connected to a housing of the aircraft such that when the flexible bladder is disconnected from the housing the flexible bladder is movable relative to the housing.

2. The aircraft of claim 1, wherein the flexible bladder is capable of expanding to at least 7% of the capacity of the fuel tank.

3. The aircraft of claim 1, wherein the flexible bladder is at least partially external to the housing of the aircraft.

4. The aircraft of claim 1, wherein the aircraft includes a fluid passage fluidly connected to the fuel tank and the flexible bladder.

5. The aircraft of claim 4, wherein the fluid passage includes a sealing disconnection, whereby the flexible bladder is fluidly disconnectable from the fuel tank.

6. The aircraft of claim 4, wherein the fluid passage includes a quick disconnect.

7. The aircraft of claim 4, wherein the fluid passage is fluidly connected to a stop valve.

8. The aircraft of claim 4, wherein the fluid passage is fluidly connected to a bi-directional valve configured to prevent fluid flow from the fuel tank and out of the fluid passage when the fluid passage is disconnected from the flexible bladder.

9. The aircraft of claim 1, wherein the fuel tank and the flexible bladder are connected by a fluid passage, wherein the fluid passage has a portion that is connected to and adjacent to a corresponding portion of the fuel tank, and wherein the portion of the fluid passage has a cross-section that is narrower than the corresponding portion of the fuel tank.

10. The aircraft of claim 1, wherein the fuel tank is a sealed fuel tank.

11. The aircraft of claim 1, wherein the aircraft is removably connected to an airplane.

12. An aircraft fuel system for use on an aircraft including:
    a fuel tank;
    a valve fluidly connected to the fuel tank, wherein the valve includes:
       an aircraft connector; and
    a compressible bladder for receiving fuel expansion from the fuel tank, wherein the compressible bladder is outside of the fuel tank and fluidly connected to an external connector connectable with the aircraft connector;
    wherein when the external connector is coupled to the aircraft connector to allow fluid flow therethrough, a fuel within the fuel tank is able to flow from the fuel tank to the compressible bladder;
    wherein when the aircraft is in a first state, the compressible bladder is fluidly connected to the fuel tank, the fuel is at a low temperature and fills the fuel tank, and the fuel has a predetermined mass;
    wherein when the aircraft is in a second state, the compressible bladder is fluidly connected to the fuel tank, the fuel is at a high temperature and excess fuel is within the compressible bladder, and the fuel has the predetermined mass; and
    wherein the compressible bladder is removably connected to a housing of the aircraft such that when the compressible bladder is disconnected from the housing the compressible bladder is movable relative to the housing.

13. The aircraft fuel system of claim 12, wherein the fuel tank is fluidly connected to the compressible bladder while the external connector is coupled to the aircraft connector.

14. The aircraft fuel system of claim 12, wherein the compressible bladder is capable of expanding to at least 7% of the capacity of the fuel tank.

15. The aircraft fuel system of claim 12, wherein the aircraft fuel system is part of an aircraft that includes a fluid passage fluidly connected to the fuel tank and the compressible bladder; and
    wherein the fluid passage includes a sealing disconnection, whereby the compressible bladder is fluidly disconnectable from the fuel tank.

16. A method of maximizing fuel in the fuel tank of the aircraft of claim 1 including:
    transferring the excess fuel from the fuel tank into the flexible bladder, where the excess fuel is the portion of an entire volume of the fuel that exceeds a maximum capacity of the fuel tank; and
    transferring at least some of the excess fuel from the flexible bladder into the fuel tank, in response to the entire volume of the fuel decreasing.

17. The method of maximizing fuel of claim 16, wherein the excess fuel is transferred in response to the entire volume of the fuel increasing.

18. The method of maximizing fuel of claim 16, further including disconnecting the flexible bladder in response to transferring the at least some of the excess fuel from the flexible bladder into the fuel tank.

19. A method of maximizing fuel in the fuel tank of the aircraft of claim 12 including:
    transferring the excess fuel from the fuel tank into the compressible bladder, where the excess fuel is the portion of an entire volume of the fuel that exceeds a maximum capacity of the fuel tank; and transferring at least some of the excess fuel from the compressible bladder into the fuel tank, in response to the entire volume of the fuel decreasing.

20. An aircraft including:
a fuel tank; and
a flexible bladder for receiving fuel expansion from the fuel tank, wherein the flexible bladder is external to the fuel tank and fluidly connected to the fuel tank such that a fuel within the fuel tank is able to flow from the fuel tank to the flexible bladder;
wherein the flexible bladder is capable of expanding to at least 5% of the capacity of the fuel tank;
wherein when the aircraft is in a first state, the flexible bladder is empty and fluidly connected to the fuel tank, the fuel is at a low temperature and fills the fuel tank, and the fuel has a predetermined mass; and
wherein when the aircraft is in a second state, the flexible bladder is fluidly connected to the fuel tank, the fuel is at a high temperature and excess fuel is within the flexible bladder, and the fuel has the predetermined mass.

* * * * *